US008333493B2

(12) United States Patent
Taleb-Bendiab et al.

(10) Patent No.: US 8,333,493 B2
(45) Date of Patent: Dec. 18, 2012

(54) DUAL-DIRECTION LIGHT PIPE FOR AUTOMOTIVE LIGHTING

(75) Inventors: Amine Taleb-Bendiab, Ann Arbor, MI (US); Manish N. Sharma, Farmington Hills, MI (US); Dianna Lynn Stadtherr, Novi, MI (US)

(73) Assignee: North American Lighting, Inc., Farmington Hills, MI (US)

( * ) Notice: Subject to any disclaimer, the term of this patent is extended or adjusted under 35 U.S.C. 154(b) by 458 days.

(21) Appl. No.: 12/417,742

(22) Filed: Apr. 3, 2009

(65) Prior Publication Data

US 2010/0254152 A1 Oct. 7, 2010

(51) Int. Cl.
*F21V 9/00* (2006.01)

(52) U.S. Cl. ......................... 362/511; 362/545; 362/555

(58) Field of Classification Search ................. 362/545, 362/555–556, 800

See application file for complete search history.

(56) References Cited

U.S. PATENT DOCUMENTS

| | | | |
|---|---|---|---|
| 5,432,876 | A | 7/1995 | Appeldorn et al. |
| 5,984,497 | A | 11/1999 | Foerstner et al. |
| 6,099,156 | A | 8/2000 | Jenkins et al. |
| 6,107,916 | A | 8/2000 | Beck et al. |
| 6,367,957 | B1 | 4/2002 | Hering et al. |

FOREIGN PATENT DOCUMENTS

| | | |
|---|---|---|
| DE | 1002279 | 2/1957 |
| DE | 4129094 | 3/1993 |
| DE | 19803518 | 8/1999 |
| DE | 19857561 | 6/2000 |
| DE | 19924411 | 11/2000 |
| DE | 20019073 | 2/2001 |
| DE | 19943821 | 3/2001 |
| DE | 10109357 | 9/2002 |
| DE | 10118687 | 10/2002 |
| DE | 19850443 | 4/2003 |
| DE | 10251849 | 5/2004 |
| DE | 10332393 | 2/2005 |
| DE | 10356483 | 7/2005 |
| EP | 0933587 | 8/1999 |
| EP | 1048893 | 11/2000 |
| EP | 1055867 | 11/2000 |
| EP | 1146281 | 10/2001 |
| EP | 1154197 | 11/2001 |
| EP | 1170545 | 1/2002 |
| EP | 1176360 | 1/2002 |
| EP | 1418087 | 5/2004 |
| EP | 1434277 A1 | 6/2004 |
| EP | 1491815 | 12/2004 |
| EP | 1596124 | 11/2005 |

*Primary Examiner* — Jason Moon Han

(74) *Attorney, Agent, or Firm* — Brinks Hofer Gilson & Lione

(57) ABSTRACT

A dual direction light pipe includes a first section having a first set of prisms oriented to reflect a portion of the light within the first section of the light pipe in a first direction and a second section having a second set of prisms oriented to reflect a portion of the light within the second section of the light pipe in a second direction.

25 Claims, 9 Drawing Sheets

14a
32
28
40
27
38
12a
25
21
26
23
16
36
30
34

DUAL-DIRECTION LIGHT PIPE FOR AUTOMOTIVE LIGHTING

BACKGROUND

1. Field of the Invention

This invention relates to lighting systems and more specifically to lighting systems for automobiles.

2. Description of the Known Art

In the past, lighting systems, such as those found in automobiles, usually consisted of a plurality of incandescent or halogen bulbs, acting as light sources, located near the front or rear of the automobile. Usually, these light sources had a fixed function. For example, certain light sources might function to provide forward lighting, while other light sources might provide rearward lighting. Or more specifically, and in the case of rearward lighting, certain light sources may be used to meet a stop/tail function, while other light sources would be needed to meet a sidemarker function. As automobile designs became increasingly complex and new and different styling options were required, such as those with a thin and elongated aspect ratio, the number of light sources required to provide complex designs generally increased. As the number of light sources generally increased, a variety of problems arose.

For example, as the number of light sources increase, there is a greater chance that one or more of these light sources will fail and need to be replaced. This can be especially problematic when a majority of the light sources are operating properly but some are not operating properly and need to be replaced. As more and more light sources are used, the frequency of replacement increases. Further, as the number of light sources increases, manufacturing cost rises. In addition, styling options may be constrained or limited based on package area required to accommodate the multiple light sources.

With the advent of high power light emitting diodes ("LEDs") coming into common usage, the light pipe offers a solution to use less light sources. For example, instead of using a single row array of low power LEDs to illuminate the area of a lamp function, one LED at one end of the light pipe may be used to illuminate the same size area. Additionally, the light pipe offers a greater variety of styling options, which is in high demand in the automotive industry. Light pipes are generally well known in the art and operate by transmitting light via total internal reflection. The light provided to the light pipe can be generated by as few as one light source, minimizing the need for numerous light sources, while offering a variety of styling options.

However, light pipes have their limitations. For example, light pipes only direct light in a single direction, based on the optical elements, i.e. prisms, facing in one direction. Moreover, although the light may have a certain amount of angular spread, the light generally is distributed around a single direction. While providing light in a single direction is useful to meet a single lamp function, multiple light sources coupled with additional light pipes may be needed if multiple functions, or multiple illuminated areas, are required.

BRIEF SUMMARY

A dual direction light pipe embodying the principles of the present invention includes a first section having a first set of prisms oriented to reflect a portion of the light within the first section of the light pipe in a first direction. Additionally, the dual direction light pipe includes a second section having a second set of prisms oriented to reflect a portion of the light within the second section of the light pipe in a second direction.

The first and second sections of the dual direction light pipe each include a plurality of prisms. The size, shape and direction of these prisms can vary depending on the application intended for the dual direction light pipe. The dual direction light pipe would be most beneficial in the application of automotive lighting in the case of meeting two lamp functions, or two separate illuminated areas, with a single light pipe. For example, a single light pipe could be used to meet both tail and sidemarker functions. Another example might be the case of a front park lamp that can be used to meet both main beam pattern photometry and the inboard and outboard photometric visibility zones. A third example might be the case of a truck bed light using a multi-section light pipe for more flexible and uniform lighting capabilities.

Further objects, features and advantages of this invention will become readily apparent to persons skilled in the art after a review of the following description, with reference to the drawings and claims that are appended to and form a part of this specification.

DETAILED DESCRIPTION OF THE DRAWINGS AND THE PRESENTLY PREFERRED EMBODIMENTS

Figure 1:
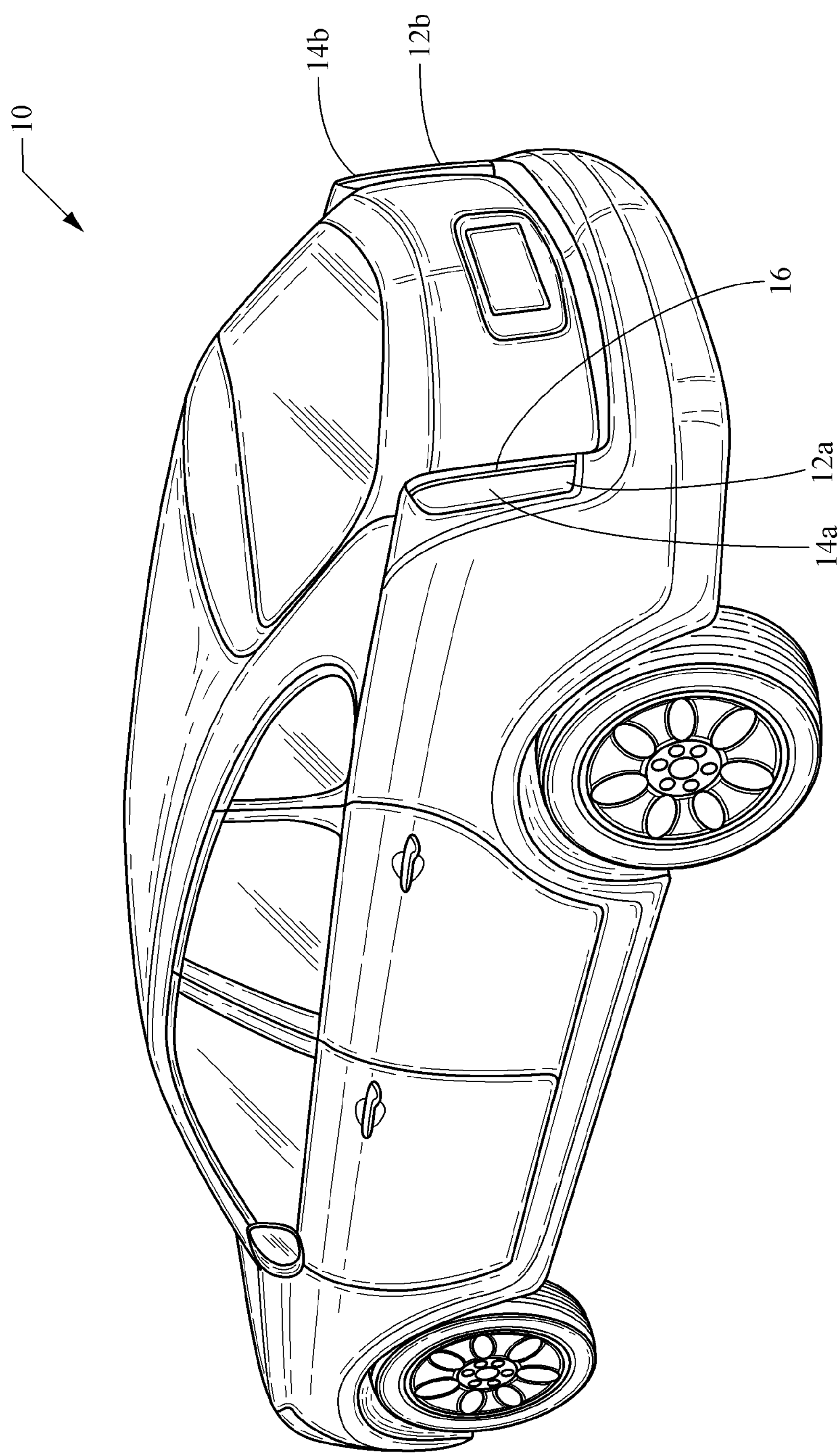
FIG. 1 illustrates a rear portion of an automobile having a dual direction light pipe embodying the principles of the present invention.

Referring to FIG. 1, an automobile 10 is shown. The automobile 10 includes taillight systems 12*a* and 12*b*. Generally, the taillight systems 12*a* and 12*b* are located at the rear of the automobile 10. The taillight systems 12*a* and 12*b* include assemblies 14*a* and 14*b*. Located within assembly 14*a* is a dual direction light pipe 16. It should be noted that assembly 14*b* also contains a dual direction lightpipe 16. Since systems 12*a* and 12*b* are generally handed, one might expect the lightpipe 16 in each assembly 14*a* and 14*b*, to be mirror imaged. A more detailed description of the dual direction light pipe 16 will be given in the paragraphs that follow.

Figure 2:
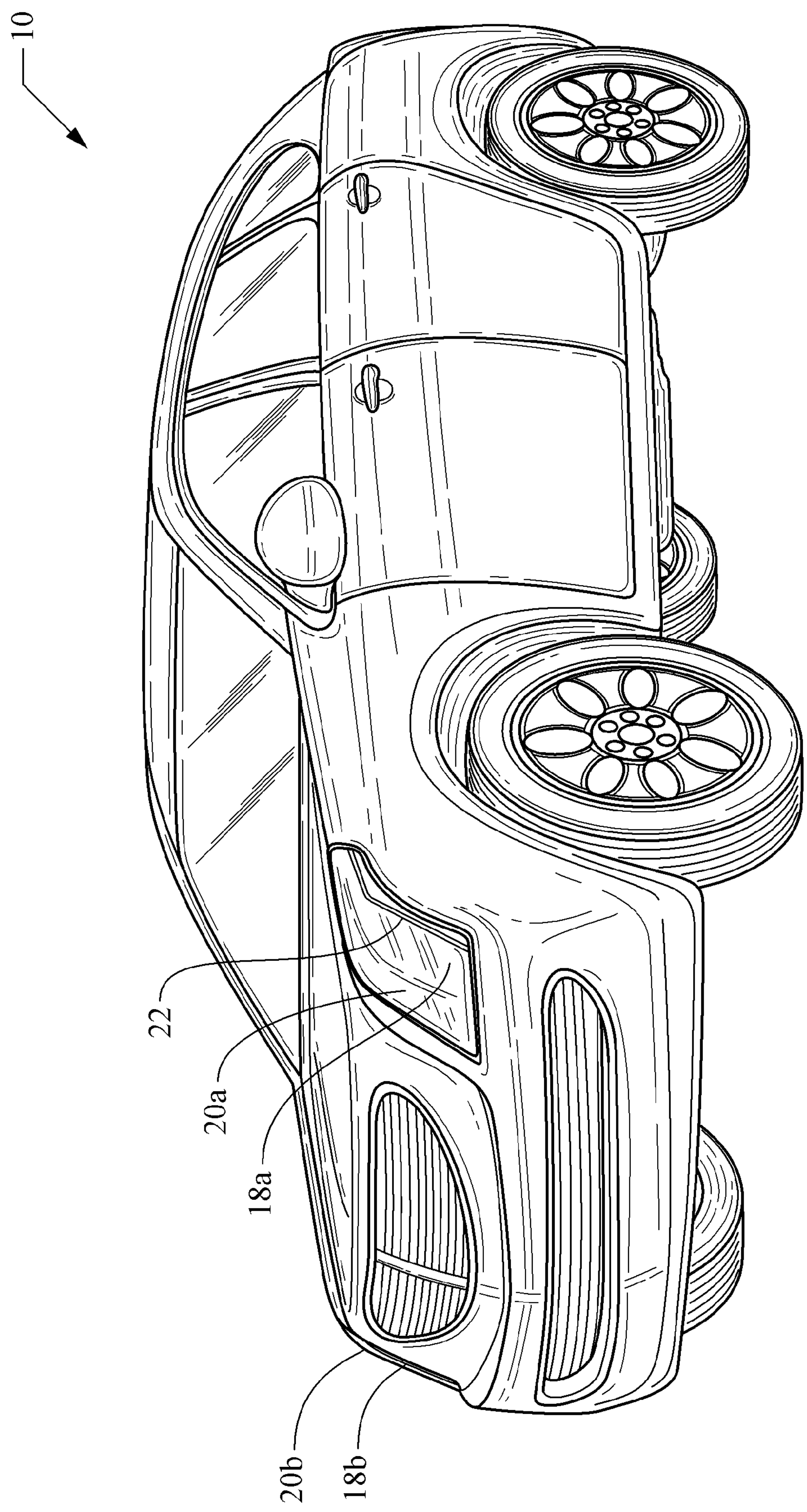
FIG. 2 illustrates a front portion of the automobile having a dual direction light pipe embodying the principles of the present invention.

Referring to FIG. 2, a front end of the automobile 10 is shown. Similar to FIG. 1, the automobile 10 includes forward lamp systems 18*a* and 18*b*. The forward lamp systems 18*a* and 18*b* generally include assemblies 20*a* and 20*b*, similar to that of the taillight assemblies 14*a* and 14*b* shown in FIG. 1.

Additionally, it should be understood that the systems 18*a* and 18*b* can each include a dual direction light pipe. For example, a front dual direction light pipe 22 is enclosed within the assembly 20*a*.

Figure 3:
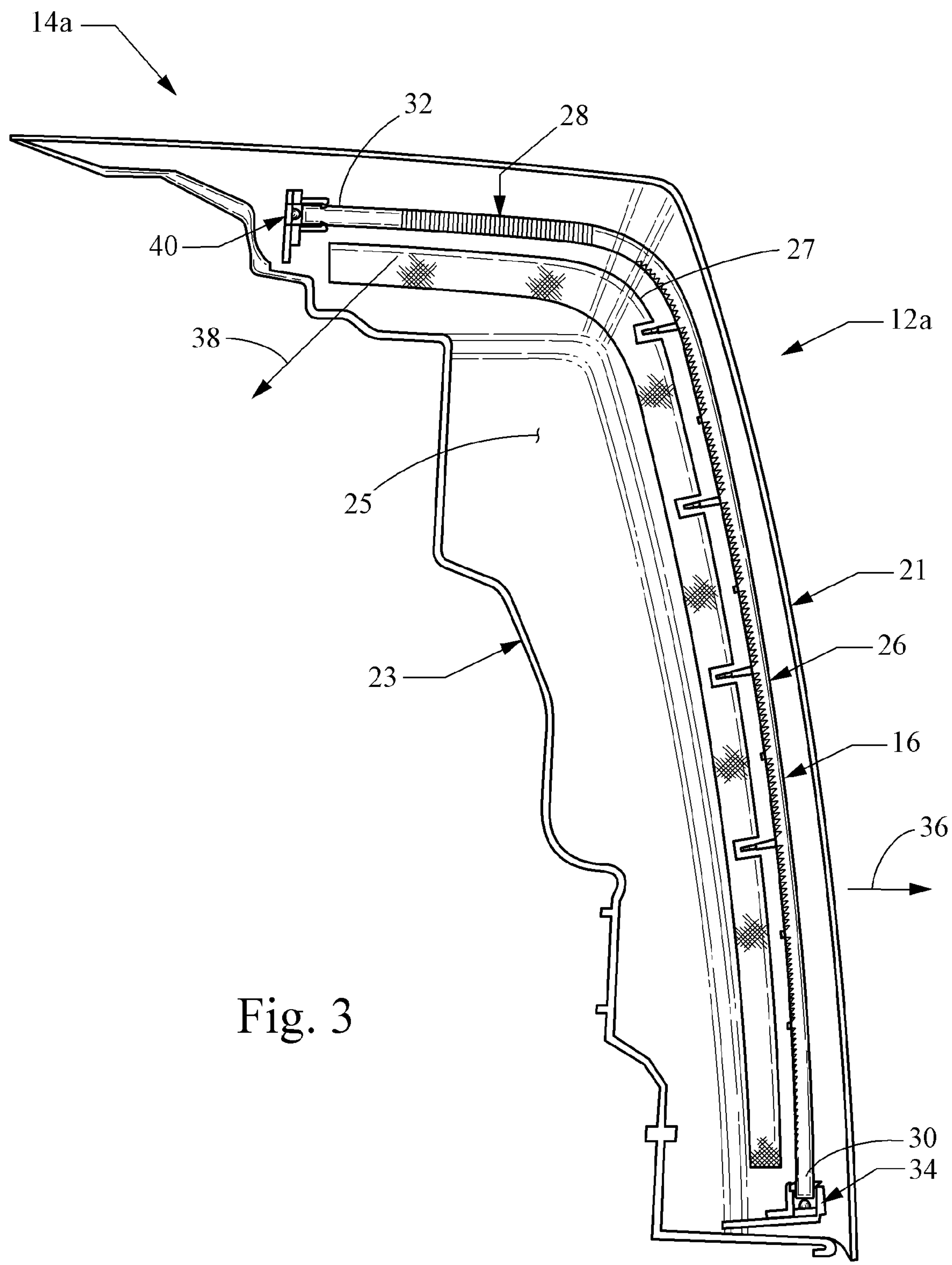
FIG. 3 illustrates a sideview of a taillight housing having a dual direction light pipe embodying the principles of the present invention.

Referring to FIG. 3, a more detailed view of the taillight system 12*a* is shown. As stated previously, the taillight system 12*a* includes an assembly 14*a*. Generally, the assembly 14*a* has a transparent portion 21, also known as the outer lens in common automotive terminology that forms part of the exterior of the automobile 10 shown in FIG. 1. The transparent portion 21 is generally made of plastic. However, it should be understood that the transparent portion 21 can be made of any suitable transparent material, including glass. Additionally, the transparent portion 21 may have varying levels of transparency, such as different color pigmentation level, or different level of neutral density filter, etc. For example, portions of the transparent portion 21 may be entirely transparent while other portions may be less transparent. Also, opaque portions can be added to the transparent portion 21 so as to stylize the taillight 12*a*.

The assembly 14*a* further includes a housing 23. The housing 23 is coupled to the transparent portion 21 so as to create a cavity 25 between the transparent portion 21 and the housing 23. The housing 23 is generally made of plastic, but can be made of any suitable material. Further, the back portion 23 may be hidden by portions of the automobile 10.

As stated previously, when the transparent portion 21 and the housing 23 are coupled to each other, a cavity 25 is formed. Located within this cavity 25 is the dual direction light pipe 16. The dual direction light pipe generally includes a first section 26 and a second section 28. It should be understood that while the dual direction light pipe 16 includes a first section 26 and a second section 28, the first section 26 and second section 28 form one continuous and unitary light pipe.

The dual direction light pipe can encompass a variety of different shapes. For example, the first and second sections 26 and 28 both generally have a slight curvature. However, one or both of the first and second sections 26 and 28 can be formed in a straight line or may have a plurality of curved as well as straight sections.

The first section 26 further includes a first end 30 located distal portion of the first section 26, away from the second section 28. Likewise, the second section 28 has a second end 32 located at a distal portion of the second section 28, away from the first section 26.

Coupled to the first end 30 of the first section 26 is a first light source 34. The first light source 34 generates a visible light that is directed into the first section 26 of the dual direction light pipe 16. As is well known in the art, the first light source 34 introduces light into the first section 26 of the dual direction light pipe 16. This introduced light then travels along the length of the first section 26 of the dual direction light pipe 16 via total internal reflection.

The cavity 25 may also contain a bezel 27. The bezel 27 generally runs along the length of the dual direction light pipe 16. The bezel may be used to secure the dual direction light pipe within the cavity or may be further used to conceal other components located within the cavity 25, so as to enhance the aesthetic appearance of assembly 14*a*.

Additionally, light generated by the first light source 34 may also travel along the second section 28 of the dual direction light pipe 16 via total internal reflection. When the first light source 34 is generating light, portions of the light travelling along the first section 26 will be directed in a first direction 36. This is accomplished by placing a plurality of prisms within the first section 26 of the dual direction light pipe 16.

Figure 4:
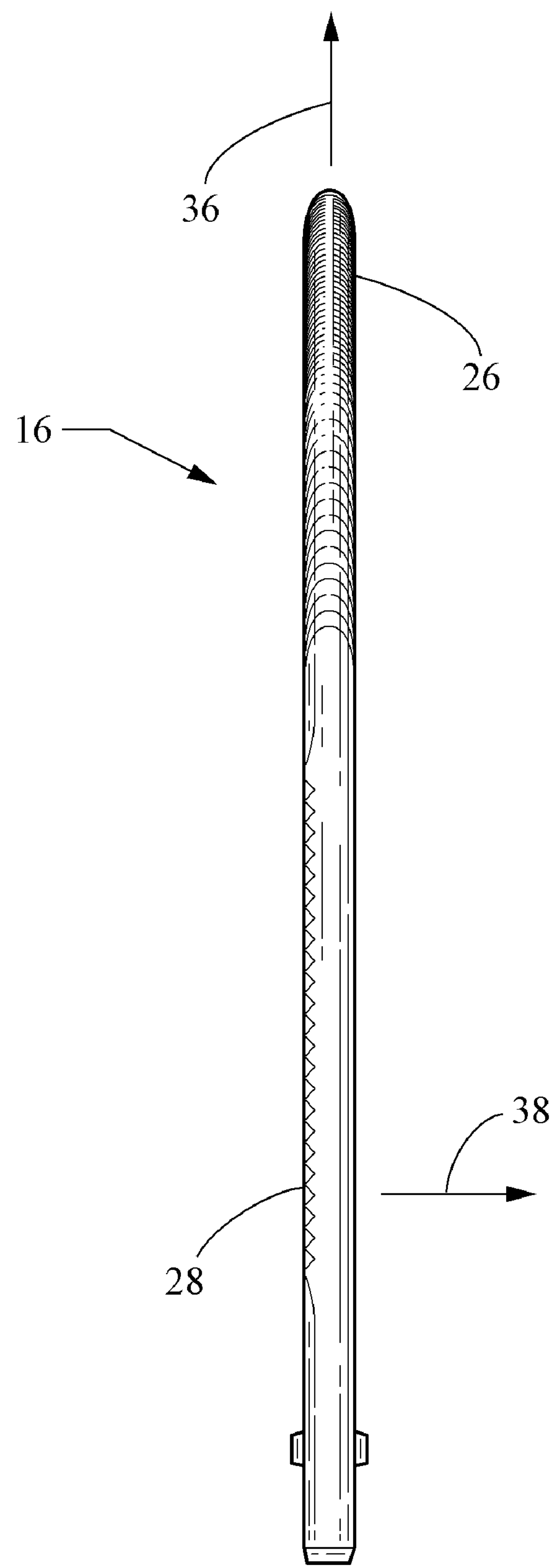
FIG. 4 illustrates a top view of the dual direction light pipe.

Portions of the light traveling along the second section 28 of the dual direction light pipe 16 can be directed in a second direction 38. Referring to FIG. 4, the second direction 38 is orthogonal to a plane containing the vector of the first direction 36. Essentially, the dual direction light pipe 16 can direct light in at least two directions. Although FIG. 4 shows the first direction 36 being approximately 90 degrees from the second direction 38, it should be understood that the second direction 38 can be anywhere greater than 0 degrees up to 180 degrees from the first direction 36, and is not equal to the first direction. The second direction may be rotated from the first direction in either a clockwise or counterclockwise fashion.

Referring back to FIG. 3, a second light source 40 can be coupled to the second end 32 of the second section 28. Similar to the first light source 34, the second light source 40 provides light to the second section 28 of the dual direction light pipe 16. Light will travel along at least the second section 28 of the dual direction light pipe 16 via total internal reflection and may even travel along the first section 26 as well. The plurality of prisms located within the second section 28 will direct portions of the light provided by the second light source 40 in the second direction 38.

Generally, the first and second light sources 34 and 40 are LEDs. However, the first and second light sources 34 and 40 may be incandescent light sources, fluorescent light sources, high intensity discharge ("HID"), or any light source suitable for providing light to the dual direction light pipe 16, such that it travels along either the first portion 26 and/or the second section 28.

Figure 5:
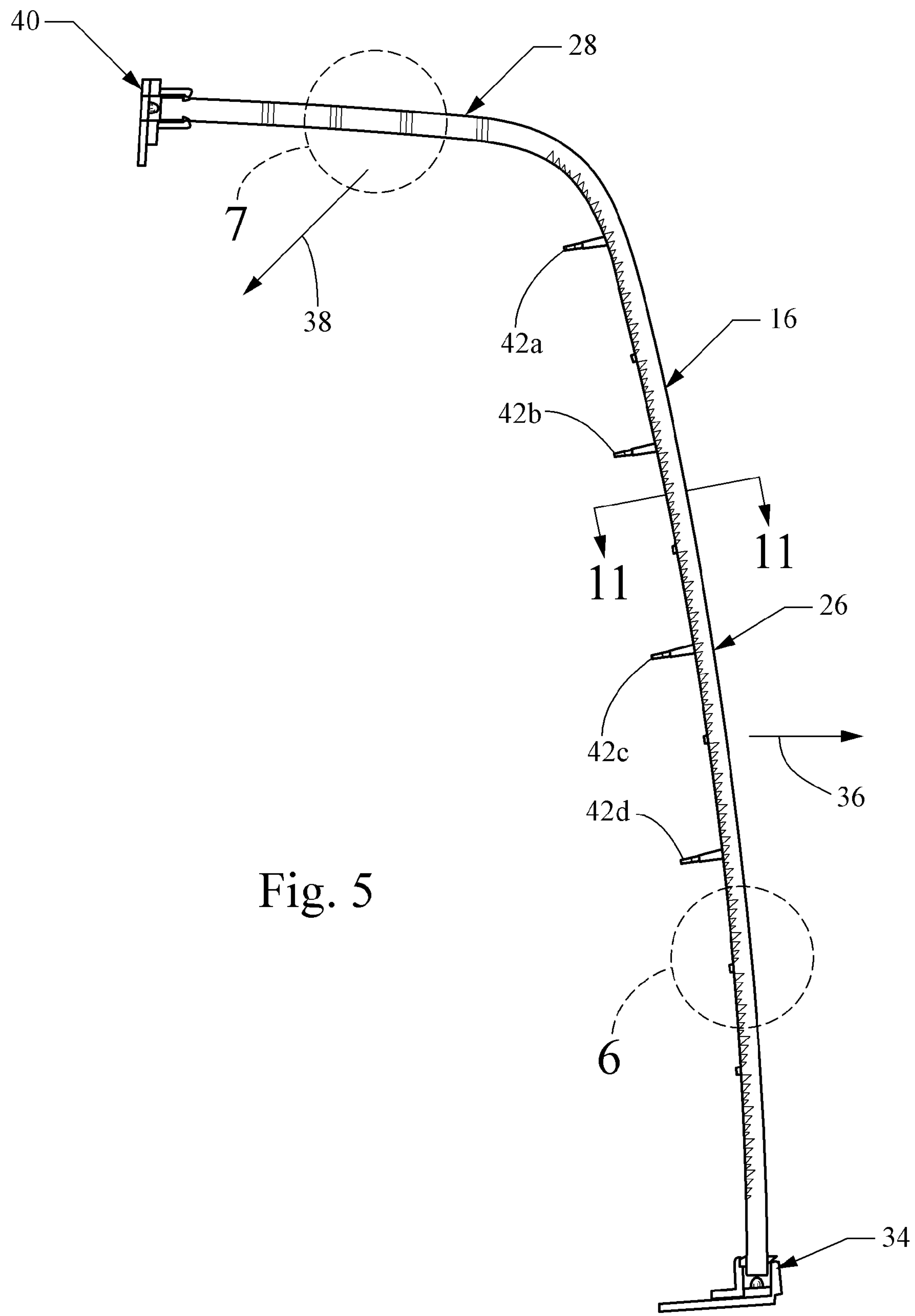
FIG. 5 illustrates a more detailed view of the dual direction light pipe.

Referring to FIG. 5, a more detailed view of the dual direction light pipe 16 is shown. Coupled to the first section 26 of the dual direction light pipe 16 are a plurality of mounting pegs 42*a*-42*d*. Generally, the mounting pegs 42*a*-42*d* are located opposite of the direction 36 in which light provided to the first section 26 of the dual direction light pipe 16 is directed. The mounting pegs 42*a*-42*d* are generally integrally formed with the dual direction light pipe 16. The mounting pegs 42*a*-42*d* function to secure the dual direction light pipe to portions of the housing 14*a*.

Although the mounting pegs 42*a*-42*d* are shown protruding from the first section 26 of the dual direction light pipe 16, the mounting pegs 42*a*-42*d* may protrude from any section of the dual direction light pipe 16, including the second section 28. Additionally, the mounting pegs 42*a*-42*d* can be an optional feature. For example, it may be possible to adequately secure the dual direction light pipe 16 by securing the first end 30 and/or second and 32 to the housing 14.

Figure 6:
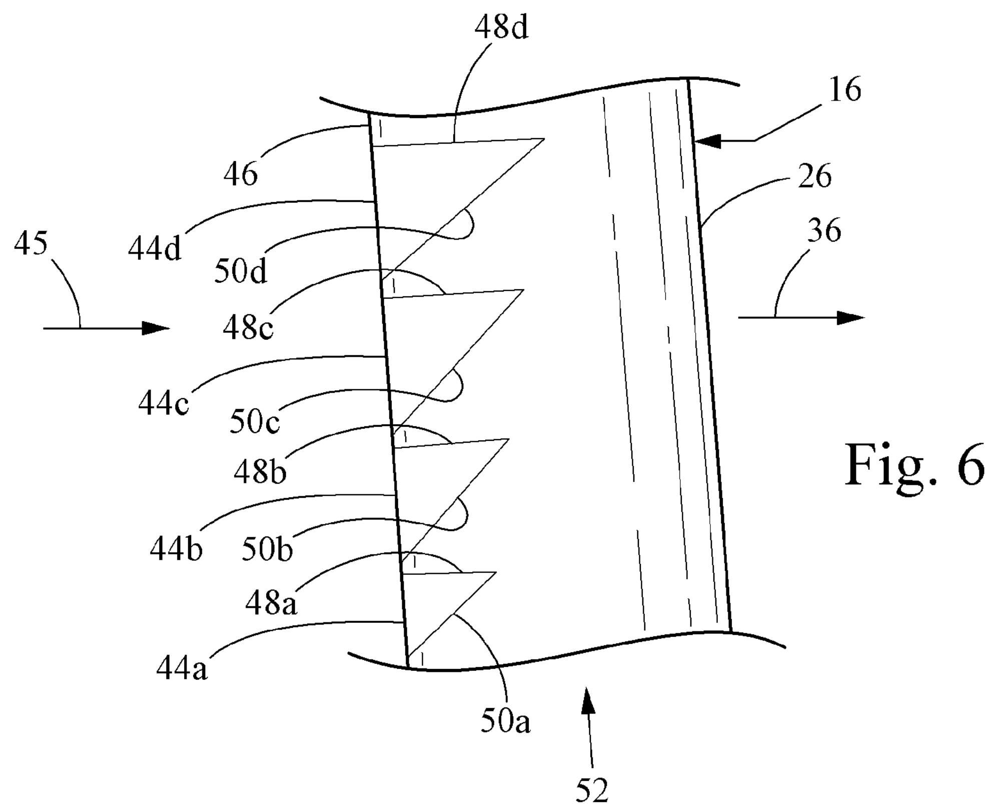
FIG. 6 illustrates a more detailed view of a first section of the dual direction light pipe.

Referring to FIG. 6, a more detailed view of the first section 26 of the dual direction light pipe 16 is shown. The detailed view shown in FIG. 6 is a portion of the first section 26 indicated by reference numeral 6 on FIG. 5. As shown, the first section 26 includes a plurality of prisms 44*a*-44*d*, oriented in a first orientation 45. Here, the plurality of prisms 44*a*-44*d* are sawtooth in shape. More specifically, the prisms 44*a*-44*d* are defined by a first side 46 that generally runs the length of the first section 26. The second sides 48*a*-48*d* are substantially perpendicular to the first side 46. Finally, third sides 50*a*-50*d* are defined between the second sides 48*a*-48*d* and the first side 46.

The plurality of prisms 44*a*-44*d* are small cutouts of material removed from the dual direction light pipe 16. When light is provided to the dual direction light pipe 16, the prisms 44*a*-44*d* interfere with the natural path of the light through the dual direction light pipe 16. This interference causes the light to reflect in a direction, such as the first direction 36.

Additionally, as light travels past the plurality of prisms, each prism functions to reflect a certain portion of the light within the dual direction light pipe 16, in the first direction 36. Therefore, as the light travels further from its light source, there is generally less and less light in the dual direction light pipe 16 with each passing prism. In order to equalize the amount of light reflected by each prism, prisms that are further away from the light source are generally larger in shape. For example, the depth of prism 44*a* is less then the depth of the prism 44*d*. By so doing, light reflected by the larger prism 44*d* will be similar to the amount of light reflected by the smaller prism 44*a*, even though the smaller prism 44*a* is closer to the light source (as indicated by arrow 52).

Figure 7:
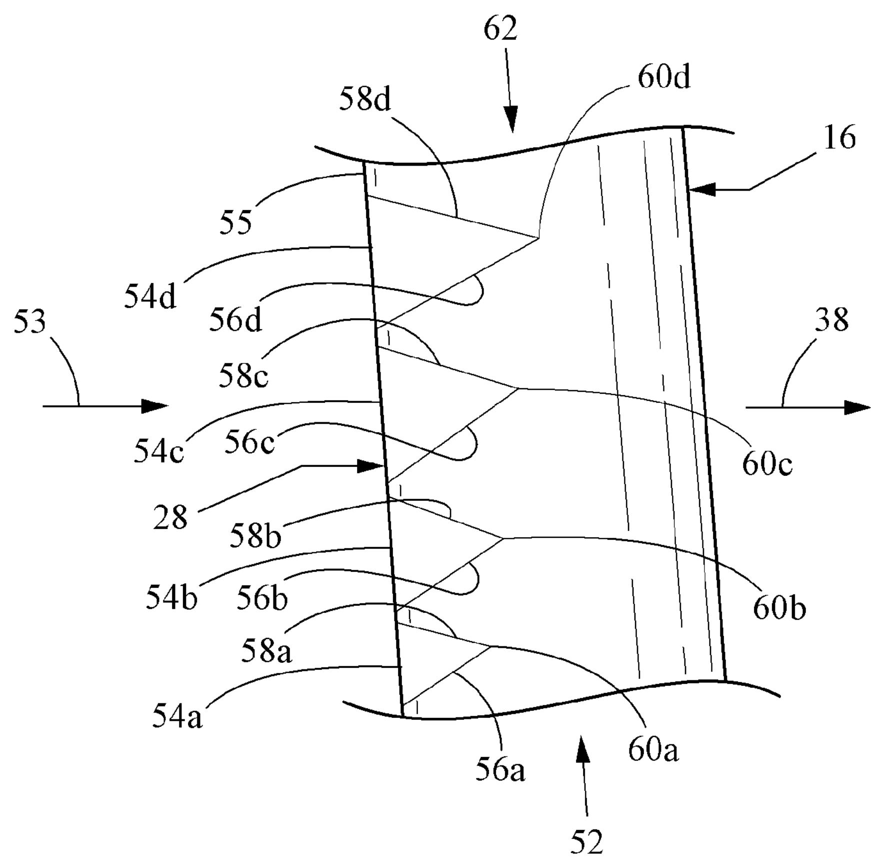
FIG. 7 illustrates a more detailed view of a second section of the dual direction light pipe.

Referring to FIG. 7, a more detailed view of a portion of the second section 28 is shown. Here, the second section 28 includes prisms 54*a*-54*d*, oriented in a second orientation 53. The prisms 54*a*-54*d* are generally triangular in shape. More specifically, a first side 55 of the second section 28 generally forms a base of the triangular prisms 54*a*-54*d*. Each of the prisms 54*a*-54*d* have second and third sides 56*a*-56*d* and 58*a*-58*d* respectfully. The second sides 56*a*-56*d* and the third sides 58*a*-58*d* essentially meet at points 60*a*-60*d*.

As light travels from the first source, through the second section 28 of the dual direction light pipe 16, (as indicated by arrow 52) it is generally reflected in the second direction 38 by second sides 56*a*-56*d*. Additionally, if a second light source is used, light provided by the second light source (as indicated by arrow 62) is generally reflected in the second direction 38 by third sides 58*a*-58*d*. Similarly, the depths of the prisms 54*a*-54*d* can vary depending on the location of the light source as providing light to the dual direction light pipe 16. For example, a prism with a smaller depth may be located closer to a light source, while a prism with a larger depth may be located further away from the light source.

It should be understood that the prisms located within the first section 26 and/or second section 28 may vary in a variety of ways. For example, although it is generally preferable to increase the size of the prisms as the distance from the light source increases, it should be understood that the size of the prisms can stay the same or may vary.

Figure 8:
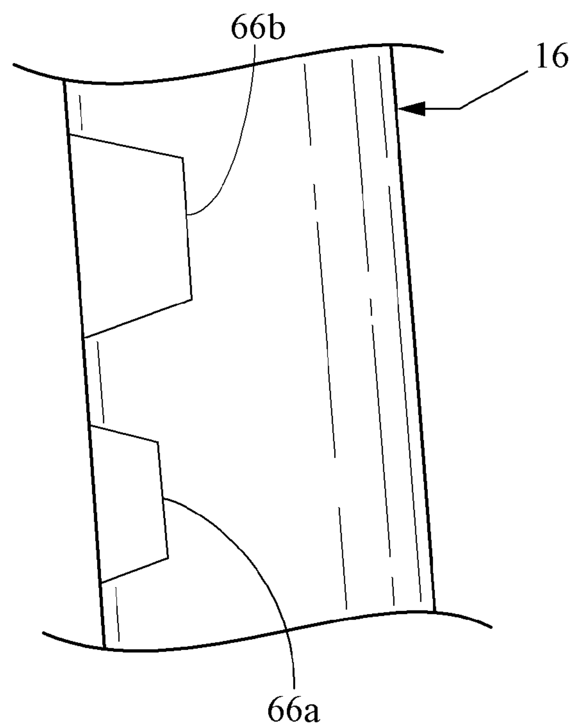
FIGS. 8, 9, and 10 illustrate different embodiments of the first and/or second sections of the dual direction light pipe.
Figure 9:
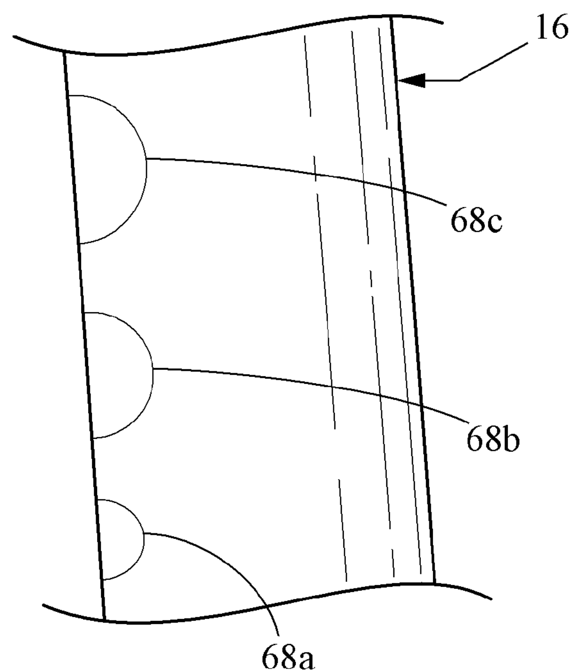
Figure 10:
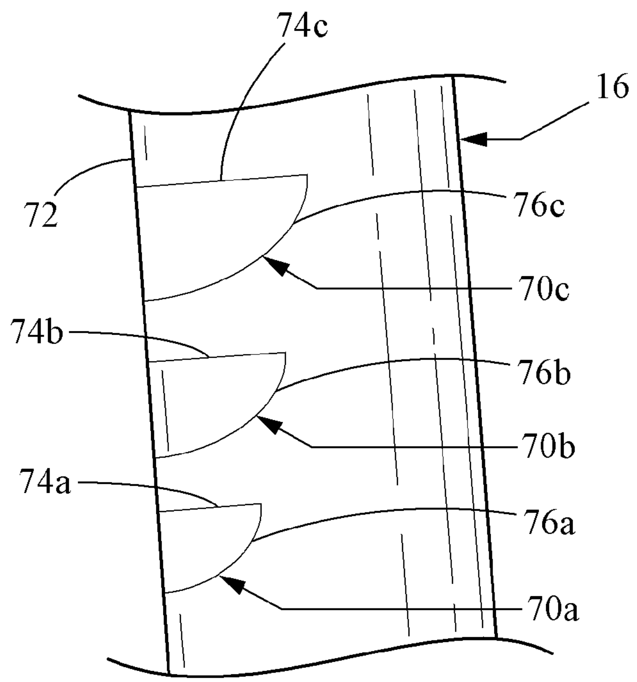

Additionally, the prisms may take a variety of different shapes. For example, referring to FIG. 8, the dual direction light pipe 16 has prisms 66*a* and 66*b* that are generally polygonal in shape. In FIG. 9, the dual direction light pipe 16 includes prisms 68*a*-68*c* that are generally circular in shape. Further, referring to FIG. 10, the dual direction light pipe 16 has conic curved prisms 70*a*-70*c*. More specifically, the conic prisms 70*a*-70*c* generally have a first side 72 that is defined by the length of the dual direction light pipe 16. Second side 74*a*-74*c* are substantially perpendicular to the first side 72. Finally, conic curves 76*a*-76*c* are then bordered by the first sides 72 and the second sides 74*a*-74*c*.

Further, the dual direction light pipe 16 may utilize different shaped prisms in different sections of the light pipe. For example, the first section 26 of the dual direction light pipe 16 may contain one shape of prism while the second section 28 may contain a different shape of prism. Additionally, the first section 26 and/or the second section 28 may each contain prisms of varying shapes. For example, the first section 26 may contain both sawtooth and triangular prisms, while the second section 28 may contain circular shaped and conic curved prisms.

Figure 11A:
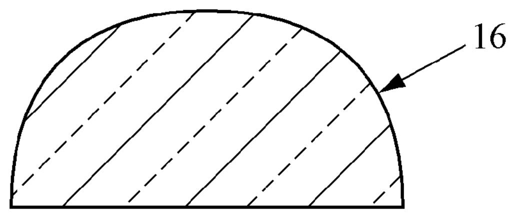
FIGS. 11*a*-11*f* illustrate different embodiments of the cross section of the dual direction light pipe.
Figure 11B:
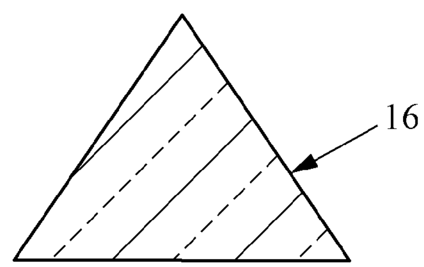
Figure 11C:
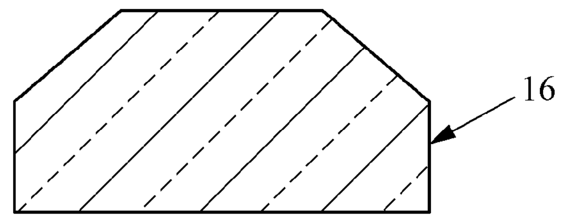
Figure 11D:
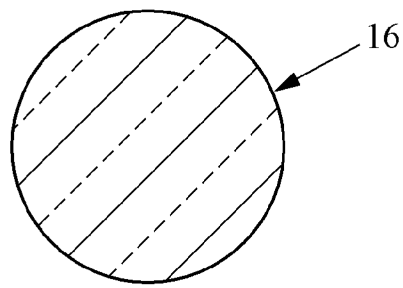
Figure 11E:
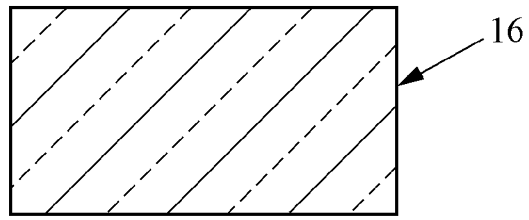
Figure 11F:
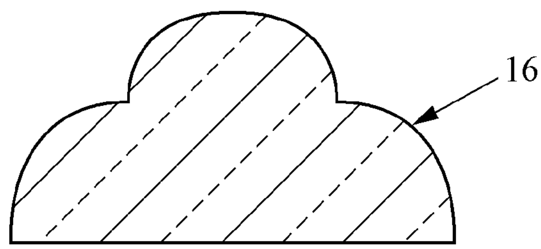

Referring to FIGS. 11*a*-11*f*, a cutaway view of the dual direction light pipe 16, as indicated by lines 11-11 of FIG. 5 is shown. Here, FIGS. 11*a*-11*f* show that the cross section of the dual direction light pipe 16 may vary. For example, in FIG. 11*a* the cross section of the dual direction light pipe is D shaped. In FIG. 11*b* the cross section of the dual direction light pipe 16 is substantially triangular in shape. Referring to FIG. 11*c*, the cross section of the dual direction light pipe 16 is polygonal in shape. Referring to FIG. 11*d*, the cross section of the dual direction light pipe 16 is substantially circular in shape. Referring to FIG. 11*e*, the cross section of the dual direction light pipe 16 is substantially rectangular (or square) in shape. Finally, referring to FIG. 11*f*, the cross section of the dual direction light pipe 16 is a free form and may contain any combination of the shapes disclosed in FIGS. 11*a*-11*e*.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

The invention claimed is:

1. An automobile light pipe comprising:

a first section having a first set of variously sized prisms oriented to reflect a portion of a light within the first section of the light pipe in a first direction;

a second section substantially perpendicular to the first section having a second set of prisms oriented to reflect a portion of the light within the second section of the light pipe in a second direction substantially perpendicular to the first direction; and wherein the first and second sections form a substantially rod shaped light pipe.

2. The light pipe of claim 1 further comprising a first light source coupled to an end of the first section, wherein light generated by the first light source travels through the first and second sections of the light pipe via total internal reflection.

3. The light pipe of claim 2, wherein the second direction is greater than zero degrees up to 180 degrees from the first direction, in either a clockwise or counterclockwise direction, and is not equal to the first direction.

4. The light pipe of claim 3, wherein the second direction of the light is determined by a second orientation of the prisms within the light pipe.

5. The light pipe of claim 1, wherein the first direction of the light is determined by a first orientation of prisms within the light pipe.

6. The light pipe of claim 2, wherein the first set of prisms are of a sawtooth shape, wherein the sawtooth shape comprises:

a first side defined by a length of the first section;

a second side being substantially perpendicular to the first side; and a third side defined between the first and second sides.

7. The light pipe of claim 6, wherein the sawtooth shapes of the first set of prisms each have a depth defined by the length of the second side of the sawtooth shape, wherein the depths of the sawtooth shapes of the first set of prisms increase as the distance from the prism to the first light source increases.

8. The light pipe of claim 6, wherein the sawtooth shapes of the first set of prisms each have a depth defined by the length of the second side of the sawtooth shape, wherein the depths of the sawtooth shapes of the first set of prisms stay constant.

9. The light pipe of claim 6, wherein the sawtooth shapes of the first set of prisms each have a depth defined by the length of the second side of the sawtooth shape, wherein the depths of the sawtooth shapes of the first set of prisms vary as the distance from the prism to the first light source increases.

10. The light pipe of claim 6, wherein the second set of prisms are of a sawtooth shape, wherein the sawtooth shape comprises:

a first side defined by length of the second section;

a second side being substantially perpendicular to a first side; and a third side defined between the first and second sides.

11. The light pipe of claim 6, wherein the second set of prisms are of a triangular shape, wherein the triangular shape comprises:

a first side defined by length of the second section; and a second side and a third side both extending from the first side at angles between zero and 90 degrees, the second and third sides meeting at a common point.

12. The light pipe of claim 6, wherein the second set of prisms are of a semicircular shape, wherein the semicircular shape comprises:

a first side defined by length of the second section; and a semicircular side bordered by the first side.

13. The light pipe of claim 6, wherein the second set of prisms are of a conic shape, wherein the conic shape comprises:

a first side defined by length of the second section; and a second side being substantially perpendicular to a first side; and a conic curve bordered by the first side and second side.

14. The light pipe of claim 6, wherein the second set of prisms are of a polygonal shape.

15. The light pipe of claim 6, wherein the second set of prisms are of a freeform shape.

16. The light pipe of claim 2, wherein the first set of prisms are of a triangular shape, wherein the triangular shape comprises:

a first side defined by length of the first section; and a second side and a third side both extending from the first side at angles between zero and 90 degrees, the second and third sides meeting at a common point.

17. The light pipe of claim 2, wherein the first set of prisms are of a semicircular shape, wherein the semicircular shape comprises:

a first side defined by length of the first section; and a semicircular side bordered by the first side.

18. The light pipe of claim 2, wherein the first set of prisms are of a conic shape, wherein the conic shape comprises:

a first side defined by length of the first section; and a second side being substantially perpendicular to a first side; and a conic curve bordered by the first side and second side.

19. The light pipe of claim 2, wherein the first set of prisms are of a polygonal shape.

20. The light pipe of claim 2, wherein the first set of prisms are of a freeform shape.

21. The light pipe of claim 2, further comprising a second light source coupled to an end of the second section, wherein light generated by the second light source travels through the second section of the light pipe via total internal reflection.

22. The light pipe of claim 1, wherein the cross sections of the first or second section of the light pipe is triangular, circular, half circular, d-shaped, conic, polygonal, freeform in shape, or any combination thereof.

23. The light pipe of claim 1, wherein the lengths of the first or second sections of the light pipe are straight, curved, circular, polygonal, or free formed curved.

24. The light pipe of claim 1, wherein the first and second sections are each substantially non-planar and together form a substantially non-linear light pipe.

25. The light pipe of claim 1, further comprising:

a taillight system for an automobile having a housing defining a cavity and an opening;

wherein the lightpipe is located within the cavity of the housing; and a transparent portion covering the opening of the housing.

* * * * *